A. LEVEDAHL.
HOSE CLAMP.
APPLICATION FILED MAY 8, 1920.
1,363,329. Patented Dec. 28, 1920.
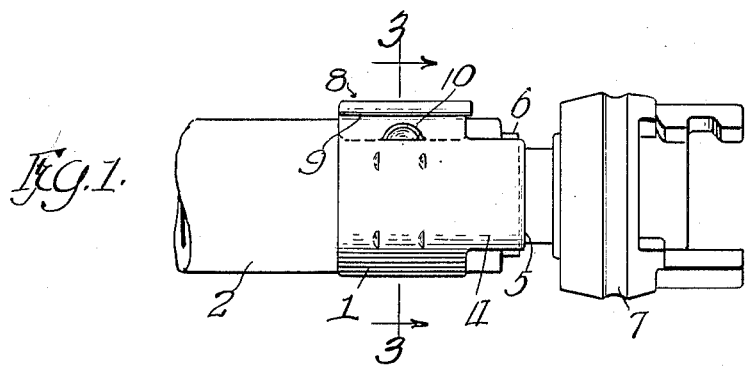
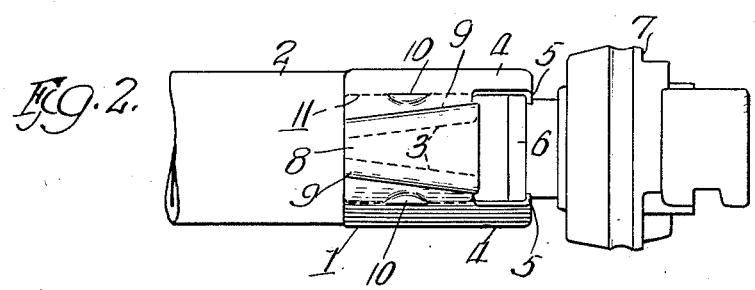
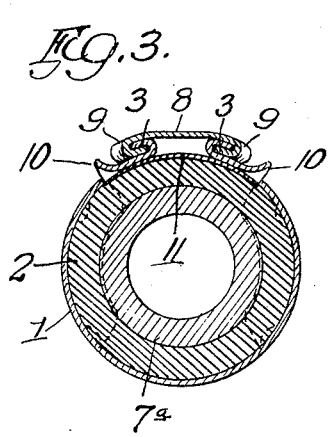
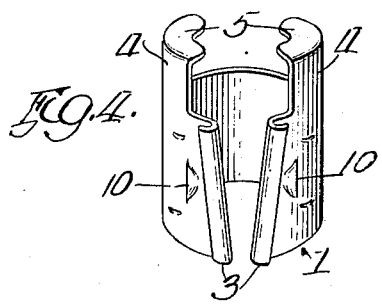
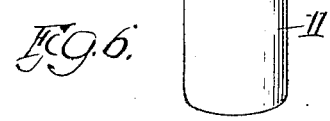
Inventor
Axel Levedahl
by Eugene Swan Atty.

UNITED STATES PATENT OFFICE.

AXEL LEVEDAHL, OF AURORA, ILLINOIS, ASSIGNOR TO INDEPENDENT PNEUMATIC TOOL COMPANY, OF CHICAGO, ILLINOIS, A CORPORATION FO DELAWARE.

HOSE-CLAMP.

1,363,329.   Specification of Letters Patent.   Patented Dec. 28, 1920.

Application filed May 8, 1920. Serial No. 379,707.

*To all whom it may concern:*

Be it known that I, AXEL LEVEDAHL, a citizen of the United States, residing at Aurora, in the county of Kane and State of Illinois, have invented new and useful Improvements in Hose-Clamps, of which the following is a specification.

This invention relates to hose clamps and consists in the matters hereinafter described and more particularly pointed out in the appended claims.

In the accompanying drawings—

Figure 1 is a side view of the hose clamp of my invention shown as applied to the end of a hose and clamping thereto one member of a hose coupling;

Fig. 2 is a top plan view of said parts;

Fig. 3 is a cross-sectional view taken on line 3—3 of Fig. 1; and

Figs. 4, 5, and 6 are perspective views, respectively, of the clamp body, the clamp key, and the filler piece.

The hose clamp of my invention comprises a tubular body 1 made from one piece of sheet metal and adapted to be clamped about the end of a hose, such as 2. The body 1 is split longitudinally at one point of its circumference and its ends at the line of severance are bent outward and from each other to provide curved flanges 3, 3, concentric with the curve of the body 1 and arranged at an angle longitudinally, as clearly shown in Fig. 4, so that the space between them is tapered. The body 1 is provided with integral lugs 4, 4 extending from one side thereof and given the same curvature as the body to engage the hose end. These lugs have their forward ends inturned, as at 5, 5, to engage an annular flange 6 on the coupling or other member 7 to be clamped to the hose 2. This member has a hollow stem or portion 7ª extending into the hose and about which the clamp holds by compression the hose portion encircled by the clamp.

To clamp the body 1 about the hose and thus hold the member 7 in place, I provide a clamp key 8 made of sheet metal, tapered and provided along its longitudinal edges with inwardly bent flanges 9, 9, curved substantially in the same circle as the flanges 3, 3 and adapted to engage the latter. The space between the flanges 9, 9 is also tapered, and the key is driven on said flanges 3, 3 in the manner of a wedge, the wide end of the flanges 9 entering the narrow end of the flanges 3.

When applying the clamp to a hose end, the body 1 is applied with its lugs 4 engaging the member 7. The clamp body 1 is then engaged by the jaws of a vise or other tool provided for the purpose, the jaws engaging the projections 10, 10 on the body 1. These projections 10, 10 are formed by forcing outwardly the metal of the body, and by drawing the jaws toward each other, the body 1 is drawn up tightly about the hose and compresses the same about the stem 7ª. Then the locking key 8 is driven on the flanges 3 to clamp the body 1 on the hose and hold the member 7 in place. Before the key is applied, a filler piece 11 of sheet metal and curved to conform to the curvature of the hose is placed against the hose to bridge the gap between the flanges 3, 3, the longitudinal side edges of the filler piece being thinned to slip beneath the ends of the body 1 at the flanges 3, as shown in Fig. 3. This piece has the same width as the body 1 and, covering the space between the flanges 3, prevents bulging and cutting of the hose between the flanges when the hose is placed under compression upon tightening the clamp thereon.

The flanges 3 are spaced outward from the body 1 only the thickness of the flanges 9 and one supports the other and the only way they can be disengaged is by shearing off the flanges, thus making the clamp unusually effective as there are no parts to accidentally drop off or become loose. The clamp key 8 not only engages the flanges 3 throughout substantially the full length thereof and thus insures locking action along all points of the flanges, but lies substantially flush with the outer surface of the hose, with the result that the clamp is less bulky, occupies less room, and is not unsightly and furthermore has no parts projecting to interfere with dragging the hose over an obstruction. By the key manner of locking there is a saving of material as the metal may be made thinner than when screw lugs are used, thus making the clamp lighter and permitting it to be made from sheet metal with the result of cheapness of construction. By having the clamp key substantially flush with the hose, the clamp may be efficiently used near a tool without any of the parts of the clamp projecting in the operator's way when using the tool.

While I have shown and described in detail a clamp of my invention as one for clamping a coupling member to a hose end, it is to be of course understood that my clamp may be equally as well used for other purposes where it is desired to compress a body whether a hose or not, and the details of construction and arrangement of parts may be variously changed and modified without departing from the spirit and scope of my invention.

I claim as my invention:

1. A clamp of the character described, comprising a one-piece tubular sheet metal body split longitudinally, and a substantially flat sheet metal key extending across said body on the outside thereof and lying substantially flush with the same, said body and key having flanges arranged at an angle longitudinally and to be engaged upon the driving of the key endwise thereon for holding the body clamped about the member engaged thereby.

2. A clamp of the character described, comprising a one-piece tubular sheet metal body split longitudinally, said body having a plurality of integral lugs extending from one side thereof and having their forward edges inturned, and a substantially flat sheet metal clamp key extending across the body on the outside thereof and lying substantially flush with the same, said body and key having flanges arranged at an angle longitudinally and to be engaged upon the driving of the key endwise thereon for holding the body clamped about the member engaged thereby.

3. A clamp of the character described, comprising a one-piece tubular sheet metal body split longitudinally and provided at the line of severance with curved flanges arranged at an angle longitudinally, and a sheet metal clamp key provided with curved flanges arranged at the same angle and adapted to engage the body flanges upon the driving of the key endwise thereon.

4. A clamp of the character described, comprising a one-piece tubular sheet metal body split longitudinally and provided at the line of severance with flanges curved outward and from each other and arranged at an angle longitudinally, and a tapered sheet metal clamp key having inturned side flanges to engage said body flanges upon the driving of the key endwise thereon.

5. A clamp of the character described, comprising a one-piece tubular sheet metal body split longitudinally and having its ends at the line of severance bent outward and away from each other to provide flanges arranged at an angle longitudinally and curved concentric to said body, and a tapered one-piece sheet metal clamp key having inturned side flanges arranged at the same angle and curved complementary to the body flanges and adapted to be driven endwise thereon, the body flanges being spaced outward from the body a distance equal to the thickness of the key flanges.

6. A clamp of the character described, comprising a one-piece tubular sheet metal body portion, split longitudinally and having its ends at the line of severance curved outward to provide flanges arranged at an angle longitudinally, a tapered one-piece sheet metal clamp key having inturned side flanges arranged at substantially the same angle and curved complementary to the body flanges and adapted to engage said body flanges upon the driving of the key endwise thereon, and a separate one-piece sheet metal filler piece removably inserted in the gap between the body flanges at the bases thereof and completing the contour of the body portion between the body flanges.

7. A clamp of the character described, comprising a one-piece tubular sheet metal body portion split longitudinally and having its ends at the line of severance curved outward to provide flanges arranged at an angle longitudinally, a tapered one-piece sheet metal clamp key having inturned side flanges arranged substantially at the same angle and curved complementary to the body flanges, said body portion being provided with an outwardly projecting part adjacent each body flange to enable a tool to engage said parts and draw the body flanges toward each other so that the key flanges may be readily engaged with the body flanges and be drawn endwise thereon.

8. A clamp of the character described, comprising a one-piece tubular sheet metal body portion split longitudinally at one point only, said body portion being provided with outwardly projecting parts on opposite sides of the line of severance and arranged at an angle longitudinally, and a substantially flat sheet metal clamp key having projecting parts arranged at substantially the same angle and to engage the parts on the body portion upon the driving of the key endwise thereon.

9. A clamp of the character described, comprising a one-piece tubular sheet metal body portion split longitudinally at one point only, said body portion being provided with outwardly projecting parts on opposite sides of the line of severance and arranged at an angle longitudinally, and a substantially flat sheet metal clamp key having projecting parts arranged at substantially the same angle and to engage the parts on the body portion upon the driving of the key endwise thereon, said body portion being provided on opposite sides of the outwardly projecting parts thereon with means whereby a tool may engage the body portion and draw said parts toward each other to enable the parts on the key to initially engage the same.

10. A clamp of the character described, comprising a one-piece sheet metal body split longitudinally and provided at the line of severance with outwardly curved flanges arranged at an angle longitudinally, a tapered sheet metal clamp key having inturned curved side flanges to engage said body flanges upon the driving of the key endwise thereon, and said body having parts on opposite sides of its flanges and adjacent the same to be engaged by the jaws of a tool for contracting the body to permit the clamp key to be inserted on the body flanges.

In testimony that I claim the foregoing as my invention, I affix my signature, this 5th day of May, A. D. 1920.

AXEL LEVEDAHL.